(12) United States Patent
Feichtinger (10) Patent No.: US 6,410,910 B1
(45) Date of Patent: Jun. 25, 2002

(54) ANGLE MEASURING SYSTEM (75) Inventor: Kurt Feichtinger, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/506,752

(22) Filed: Feb. 18, 2000

(30) Foreign Application Priority Data

Feb. 20, 1999 (DE) .......................................... 199 07 326

(51) Int. Cl.$^7$ ................................................ G01D 5/34
(52) U.S. Cl. ........................... 250/231.13; 250/231.14; 250/231.18
(58) Field of Search .................. 250/231.13, 231.14, 250/231.18, 230, 232, 233

(56) References Cited

U.S. PATENT DOCUMENTS

| | | | |
|---|---|---|---|
| 4,369,578 A | | 1/1983 | Ernst |
| 4,495,700 A | * | 1/1985 | Ernst ................................ 33/1 |
| 4,512,184 A | * | 4/1985 | Ernst et al. .................... 73/116 |
| 4,530,155 A | | 7/1985 | Burkhardt et al. |
| 4,530,159 A | | 7/1985 | Ernst |
| 4,616,131 A | | 10/1986 | Burkhardt |
| 4,660,288 A | | 4/1987 | Dangschat |
| 4,667,096 A | | 5/1987 | Dangschat |
| 4,700,062 A | | 10/1987 | Ernst |
| 5,004,915 A | | 4/1991 | Umehara et al. |
| 5,202,842 A | | 4/1993 | Suzuki |
| 5,981,940 A | | 11/1999 | Setbacken et al. |

FOREIGN PATENT DOCUMENTS

| | | |
|---|---|---|
| CH | 426 285 | 6/1967 |
| DE | 32 28 507 | 2/1984 |
| DE | 34 45 617 | 7/1985 |
| EP | 0 325 924 | 8/1989 |
| EP | 0 412 481 | 2/1991 |
| EP | 0 412 481 B1 * | 2/1991 ............ G01D/5/36 |

OTHER PUBLICATIONS

Patents Abstracts of Japan regarding Japanese publication, 55–67608, vol. 4, No. 10, Aug. 8, 1980, p–22.

A. Ernst, Digital Langen– und Winkelmesstechnik, Die Bibliothek der Technik published by Heidenhain, 3. Auflage 1998, pp. 60–71.

* cited by examiner

Primary Examiner—Robert H. Kim
Assistant Examiner—Courtney Thomas
(74) Attorney, Agent, or Firm—Brinks Hofer Gilson & Lione (57) ABSTRACT

An angle measuring system for high-precision determination of the angular position of an object, the system including a stationary component unit, a rotationally symmetrical measurement graduation that is connected to an object that rotates about an axis of rotation (R) and a plurality of scanner units that are disposed in a defined three-dimensional orientation in the stationary component unit and serve to scan the measurement graduation at a plurality of different measurement graduation sites and generate angular-position-dependent fractional scanning signals. The system includes a correction system that receives the fractional scanning signals of the scanner units and generates angle-dependent output signals that are freed of errors that result from a possibly occurring nonagreement of the axis of rotation (R) of the object with an axis of symmetry of the measurement graduation.

40 Claims, 3 Drawing Sheets

ANGLE MEASURING SYSTEM

Applicant claims, under 35 U.S.C. §119, the benefit of priority of the filing date of Feb. 20, 1999 of a German patent application, copy attached, Ser. No. 199 07 326.0, filed on the aforementioned date, the entire contents of which are incorporated herein by reference.

BACKGROUND OF THE INVENTION

1. Field of the Invention

The present invention relates to an angle measuring system, in particular an angle measuring system without its own bearing.

2. Discussion of Related Art

High-precision angle measuring systems with a shaft in the measuring system and a corresponding independent bearing of the shaft are known for instance from the book entitled "Digitale Längen- und Winkelme technik" [Digital Length and Angle Measuring Technology] by A. Ernst, Verlag Moderne Industrie, 3rd edition, 1998, pp. 61–64. To achieve the requisite measuring accuracy, high-precision bearings, which are correspondingly expensive, by way of which the shaft is supported are required in the angle measuring system. Via a suitable coupling, the shaft is connected to a graduation disk that carries the radial measurement graduation. The measurement graduation is in turn scanned by means of stationary scanner units in the angle measuring system to generate angle-dependent output signals. For further processing, the angle-dependent output signals are transmitted, for instance in the form of sine-wave incremental signals, to a downstream evaluation unit.

From the same book, pages 64–70, angle measuring systems without their own bearing are also known, in which a rotationally symmetrical measurement graduation or a corresponding graduation disk is disposed directly on a rotating shaft. One or more scanner units are provided stationary relative to the rotating graduation disk, and by way of them the measurement graduation is scanned, for instance photoelectrically. In such systems, the scanner units are not fixedly disposed relative to the graduation disk or measurement graduation but instead have to be correctly aligned to it during assembly, which involves corresponding effort and expense for calibration. It is also not assured a priori in these angle measuring systems that the axis of rotation of the rotating shaft will coincide with the axis of the graduation disk; that is; there may possibly be some eccentricity or a tumbling motion of the rotating graduation disk, which in turn leads to erroneous measurements. It has therefore already been proposed that the resultant errors in eccentricity be eliminated with the aid of a plurality of separate scanner units. In this connection, European Patent Disclosure EP 0 325 924 B1 of the present applicant can for instance be named. Nevertheless, in this case again, exact calibration of the scanner units relative to the rotating measurement graduation is required.

So-called preassembled built-in rotary angle encoders are also known, which again have no bearing of their own and in which one or more scanner units include a stationary part and serve to scan the graduation disk that is disposed on a rotating shaft. In these systems as well, as with the angle measuring systems without their own bearing mentioned above, high-precision calibration of the scanner units relative to the rotating measurement graduation is necessary.

OBJECTS AND SUMMARY OF THE INVENTION

It is therefore an object of the present invention to disclose an angle measuring system that performs as well as much as possible without a complicated bearing of its own and nevertheless permits high-precision, error-free detection of the angular position of a rotating object. The angle measuring system should be as simple as possible to assemble, without major effort or expense for calibration.

This object is attained by an angle measuring system for high-precision determination of the angular position of an object, the system including a stationary component unit, a rotationally symmetrical measurement graduation that is connected to an object that rotates about an axis of rotation (R) and a plurality of scanner units that are disposed in a defined three-dimensional orientation in the stationary component unit and serve to scan the measurement graduation at a plurality of different measurement graduation sites and generate angular-position-dependent fractional scanning signals. The system includes a correction system that receives the fractional scanning signals of the scanner units and generates angle-dependent output signals that are freed of errors that result from a possibly occurring nonagreement of the axis of rotation (R) of the object with an axis of symmetry of the measurement graduation.

The provisions according to the invention now make it possible to achieve a high-precision angle measuring system without its own complicated bearing. Instead, the existing bearing of the rotating object or the corresponding shaft, whose angular position is to be detected, is utilized for the rotating measurement graduation as well. This may for instance be a rotary table on a machine tool.

Calibration and assembly problems relating to the correct positioning of the scanner units with respect to the rotationally symmetrical measurement graduation are also eliminated, since the scanner units are already preassembled in a component unit by the manufacturer. Because of the provisions to be described in detail hereinafter, no further calibration of the scanner units after they are installed on a rotating shaft has to be done by the user.

Any eccentricity errors that may be present, caused for instance by the imperfect concentricity of a shaft, are corrected by the use according to the invention of correction means in the angle measuring system. Certain scanning arrangements with a plurality of scanning fields and certain signal processing elements in the angle measuring system function as the correction means here. The angle measuring system of the invention accordingly generates one or more angle-dependent output signals that have no eccentricity errors.

Within the scope of the present invention, it is understood that along with the exemplary embodiment described below, the most manifold further variant embodiments are also possible.

For instance, the type of scanning is not limited to optical or photoelectric systems; alternatively, other physical scanning principles can be employed to scan the measurement graduation, such as inductive, capacitive or magnetic scanning principles.

Along with scanning the graduation disk, it is understood that so-called drum scanning can be performed on the basis of the concepts of the invention. Besides the embodiment as a transmitted light system, an embodiment as an incident light system with a reflective measurement graduation can also be realized at any time.

Along with one or more incremental measurement graduations, additional tracks next to the measurement graduation can also be provided, which for instance carry coded reference markings to identify absolute positions, and so forth.

Manifold options also exist as to the form in which the output signals, free of errors of eccentricity, are transmitted to the downstream evaluation unit. For instance, transmission in analog sine-wave form or in the form of digital square-wave signals or in serially encoded form is possible. In particular this last form of data transmission makes it possible to transmit further additional information from the angle measuring system of the invention to the evaluation unit.

Further advantages along with details of the angle measuring system of the invention will become apparent from the ensuing description of exemplary embodiments in conjunction with the accompanying drawings.

DESCRIPTION OF THE PREFERRED EMBODIMENTS

In conjunction with FIG. 1, the fundamental mechanical layout of one possible embodiment of the angle measuring system of the invention will be described below. What is shown is a partly schematic sectional view, taken from the side, of an angle measuring system 10 disposed on a rotary table of a machine tool.

Of the rotary table, only one stationary part 50 can be seen, which takes the form of a cylinder jacket. In the interior of the cylinder, a shaft 51 of the rotary table, rotating about the axis of rotation R, is indicated. The shaft 51 is supported via suitable bearings in the stationary part 50 of the rotary table; for the sake of simplicity, the bearings are not shown in FIG. 1.

The angle measuring system 10 of the present invention, with which the angular position of the rotating shaft 51 is determined with high precision, is disposed on the lower end of the rotary table. The angle measuring system has no bearing of its own; the rotating shaft 51, whose angular position is determined, is instead rotatably supported about the axis R by the same bearings that are assigned to the rotary table.

Essentially, the angle measuring system shown has a two-part construction, which on the one hand includes a stationary component unit that is connected to the stationary part 50 of the rotary table. The connection of the stationary component unit of the angle measuring system to the stationary part 50 of the rotary table is done here via screw connections 10a, 10b. On the other hand, the angle measuring system also includes a rotating part with a measurement graduation 4.

The stationary component unit also includes both a housing 1 and a plurality of scanner units 2 for photoelectric transmitted light scanning of a measurement graduation 4. The scanner units 2 are used for scanning the rotating measurement graduation 4 at a plurality of different measurement graduation sites and generate a plurality of angular-position-dependent fractional scanning signals. The various scanner units 2 are each disposed here in a defined three-dimensional orientation in the stationary component unit. In the view of FIG. 1, only a single scanner unit 2 can be seen, of the total of four scanner units provided. In the version shown as a photoelectric transmitted light system, the scanner units 2 include a light source 2.1, optionally a collimator optical system 2.2 preceding the light source 2.1, one or more scanning fields with scanning graduations, which cannot be seen in FIG. 1, and one or more optoelectronic detector elements 2.3. The detector elements 2.3 are disposed on a carrier board 3, which is also located in the housing 1.

As already indicated above, the scanning arrangement selected functions as a correction system, by way of which measured angular position values that are as free of eccentricity errors as possible are to be generated. With regard to the scanning arrangement selected according to the invention, European Patent Disclosure EP 0 412 481 B1 of the present Applicant is expressly incorporated by reference at this point. FIG. 7 of this reference discloses one example of a scanning arrangement, which is preferably used in the present angle measuring system at a plurality of scanning locations. The scanning arrangement here includes two groups, each with four scanning fields angled about a common axis. The scanning fields are disposed such that the component of the center of area of all the scanning fields of one group as measured along the common axis is equal to the component along the common axis of the center of area of the scanning fields of the other group. The interconnection of the eight scanning fields associated with the detector elements is done here in accordance with FIG. 10 of EP 0 412 481 B1. Per scanner unit in this scanning arrangement, two fractional scanning signals result, which even in the event of a possible eccentricity have both a stable face relationship to one another and a stable amplitude ratio to one another.

In principle, it is understood that the other variants of scanning arrangements disclosed in EP 0 412 481 B1 can also be employed in the angle measuring system according to the present invention.

On the carrier board 3, along with the detector elements 2.3, as a rule, still further signal processing elements are disposed, acting as further correction components, which serve the purpose of further processing of the fractional scanning signals detected via the detector elements 2.3. With respect to these correction components or the signal processing done by way of them, reference will be made merely to the description below of FIGS. 2a and 2b.

Figure 1:
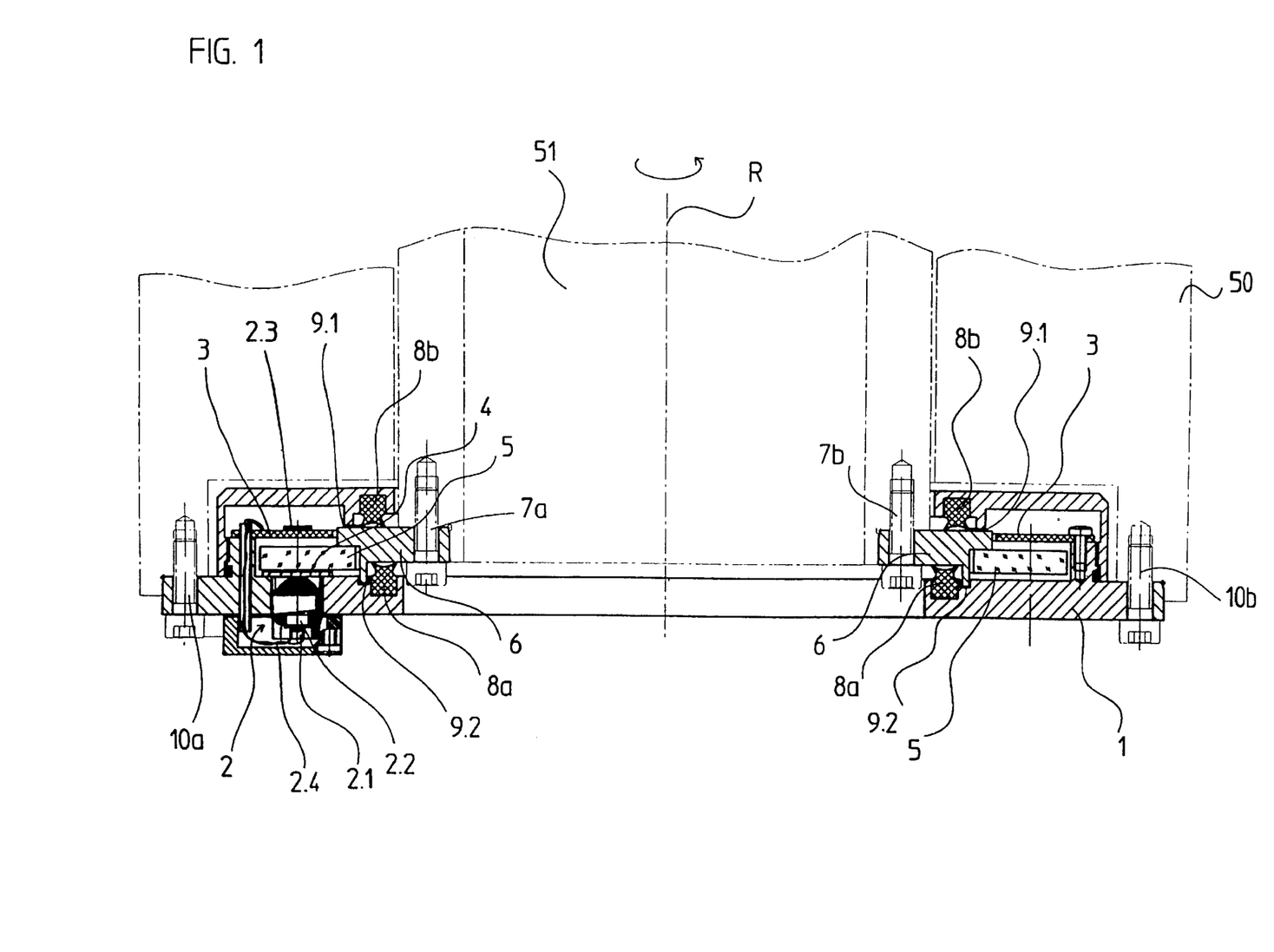
FIG. 1 is a schematic side view of a first embodiment of the angle measuring system according to the invention, in conjunction with a rotary table.

As can also be seen in FIG. 1, the parts on the transmission side of the scanner unit 2 are connected via a signal transmission line 2.4 to the carrier board 3 and to electronic components on the detector side disposed thereon.

In contrast to known bearingless angle measuring systems, the angle measuring system 10 of the present invention has scanner units 2 that are already preassembled and precalibrated by the manufacturer. Accordingly separate, time-consuming calibration of them on-site by the user is no longer necessary. The angle measuring system 10 of the present invention can thus be considered an autonomous unit in terms of its assembly.

The second part of the angle measuring system 10 of the present invention includes the measurement graduation 4, disposed essentially inside the stationary component unit; relative to the stationary component unit and the scanner units 2 disposed in it, this measurement graduation is moveable about the axis of rotation R. The circular-annular measurement graduation 4 is disposed here on a circular-annular glass substrate disk 5 and, in the transmitted light variant shown, for instance includes opaque chromium ribs and transparent gaps located between them; that is, a familiar incremental measurement graduation is used as the measurement graduation 4. The substrate disk 5 in turn is disposed on a circular-annular carrier ring 6 of metal, by way of which the connection of the measurement graduation 4 to the rotating shaft 51 is also done. To that end, the carrier ring 6 is connected to the shaft 51 rigidly, that is, in a manner fixed against relative rotation, via screw connections 7a, 7b. The screw connections 7a, 7b are oriented axially relative to the axis of rotation R, which represents an especially rotationally rigid coupling of the measurement graduation 4 to the rotating shaft 51.

Between the housing 1 of the stationary part of the component unit and the carrier ring 6, sealing elements 8a, 8b are also provided on the moveable part. The sealing elements 8a, 8b are disposed above and below the rotating carrier ring in the housing 1 and are embodied for instance as polyurethane lip seals. Alternatively, other sealing elements, such as O-rings, V-seals, etc. can naturally be used here to seal off the interior of the stationary housing 1 of the angle measuring system from the rotating shaft 51.

Since the angle measuring system 10 of the present invention has no bearing of its own but instead the rotating shaft 51 is rotatably supported in the existing turntable bearings, an eccentricity of the rotating measurement graduation 4 can possibly occur. This is true if the axis of rotation R does not agree with the axis of symmetry of the measurement graduation 4. Such an eccentricity can be caused for instance by existing bearing and/or fit tolerances. The consequence of possible eccentricities are errors in the determination of the exact angular positions. As will be explained hereinafter in conjunction with the two FIGS. 2a and 2b, along with the correction components on the scanning side of the angle measuring system of the invention, still further correction components are provided, to compensate for such eccentricity caused measurement errors.

In terms of the mechanical design of the angle measuring system 10, it should be noted in this respect that the part of the angle measuring system 10 that rotates in the stationary housing 1, that is, the carrier ring 6 with the substrate disk 5 and measurement graduation 4, must not be allowed to collide with the housing 1 during rotation, even if possible eccentricities exist. The interior of the housing 1 should accordingly be dimensioned such that even a possible eccentricity of the rotating part will not lead to a collision with stationary parts.

Also in the angle measuring system 10 of the present invention, limiting contact surfaces 9.1, 9.2 are provided in the stationary component unit between the rotating carrier ring 6 and the housing 1; they limit the maximum allowable axial and radial motions between the carrier ring 6 and the housing 1. In particular, a collision of the glass substrate disk 5 with the housing 1 is prevented by them. The limiting contact surface 9.1 serves to limit the axial motion of the carrier ring 6, while the limiting contact surface 9.2 serves to limit the radial motion of the carrier ring 6.

Two variants for signal processing within the angle measuring system 10 of the present invention will now be explained in terms of FIGS. 2a and 2b.

Both drawing figures schematically show in the upper part the incremental measurement graduation 4, rotating about the axis R, of the angle measuring system 10; in this exemplary embodiment, the measurement graduation 4 is photoelectrically scanned by a total of four stationary scanner units 2 (denoted as A1–A4). Below that, the various electronic signal processing elements in the angle measuring system 10 are shown, which function as further correction components to eliminate errors caused by eccentricity. Note that the arrangement of the four scanner units 2 in combination with the processing system that includes the various electronic signal processing elements are deemed to be a correction system.

The four scanner units A1–A4 are disposed at a spacing of 90° from one another and, in the case of above-described scanning arrangement of EP 0 412 481 B1, in principle they generate two sine-wave and cosine-wave fractional scanning signals per scanner unit A1–A4 that are phase offset by 90° from one another; that is, a total of eight fractional scanning signals are available. For the sake of greater simplicity, however, FIGS. 2a and 2b each show only a single fractional scanning signal TAS1–TAS4 per scanner unit A1–A4, or in other words four fractional scanning signals. However, this changes nothing in the basic way in which signal processing is done according to the present invention.

The fractional scanning signals TAS1–TAS4 are each in the form of analog sine-wave signals. In the two variants shown in FIGS. 2a and 2b, the fractional scanning signals TAS1–TAS4 are optionally amplified and are initially delivered to comparator units K1–K4, by way of which digital square-wave fractional scanning signals TRS1–TRS4, respectively, are generated from the sine-wave or analog fractional scanning signals TAS1–TAS4. The square-wave fractional scanning signals TRS1–TRS4 are then delivered to respective counter units Z1–Z4, which in a known manner add up the square-wave pulses of the fractional scanning signals TRS1–TRS4. On the output side, the counter units Z1–Z4 accordingly generate digital counter states ZS1–ZS4 as a function of the fractional scanning signals TRS1–TRS4 delivered. Also in both embodiments, the counter states ZS1–ZS4 are then delivered to an adder unit ADD. At the output of the adder unit ADD, an angle-dependent output signal Z is then available, which on the basis of the processing described is error-corrected even in the event of possible eccentricities of the rotating measurement graduation. The error-corrected output signal Z is accordingly, as before, an angular-position-dependent counter state. Because of the addition of the counter states ZS1–ZS4 that is performed, the eccentricity-caused measurement errors can be eliminated in a known manner. In conjunction with this known provision, see for instance Swiss Patent Disclosure CH 426 285.

The primary advantage of this type of eccentricity error correction is that in principle, complete signal erasure cannot occur. The complete signal erasure does occur for instance in the case of eccentricity correction by the addition of analog sine-wave scanning signals, if certain phase relationships exist between the fractional scanning signals of different scanning points.

It is also expressly emphasized here that as described above, the correction of the eccentricity-caused measurement errors is done via the correction components that according to the invention are in the angle measuring system 10. Accordingly, what is transmitted to the evaluation unit AE downstream of the angle measuring system 10 is error-corrected position measurement values, without the evaluation unit AE having to take further corrective steps itself.

Figure 2A:
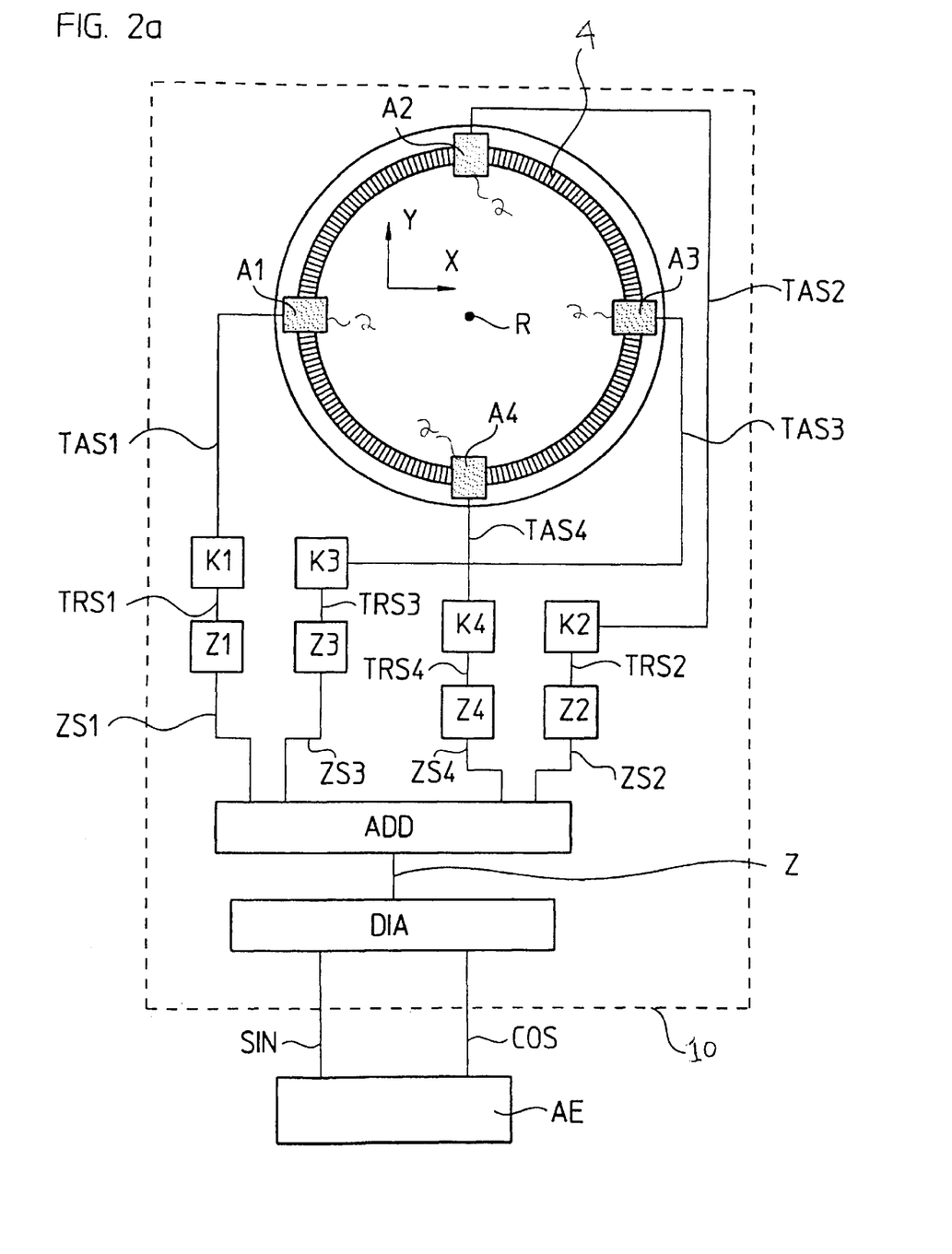
FIG. 2a is a schematic illustration of first embodiment of signal processing in the angle measuring system according to the present invention, for instance of the kind that can be attained in the embodiment of FIG. 1.
Figure 2B:
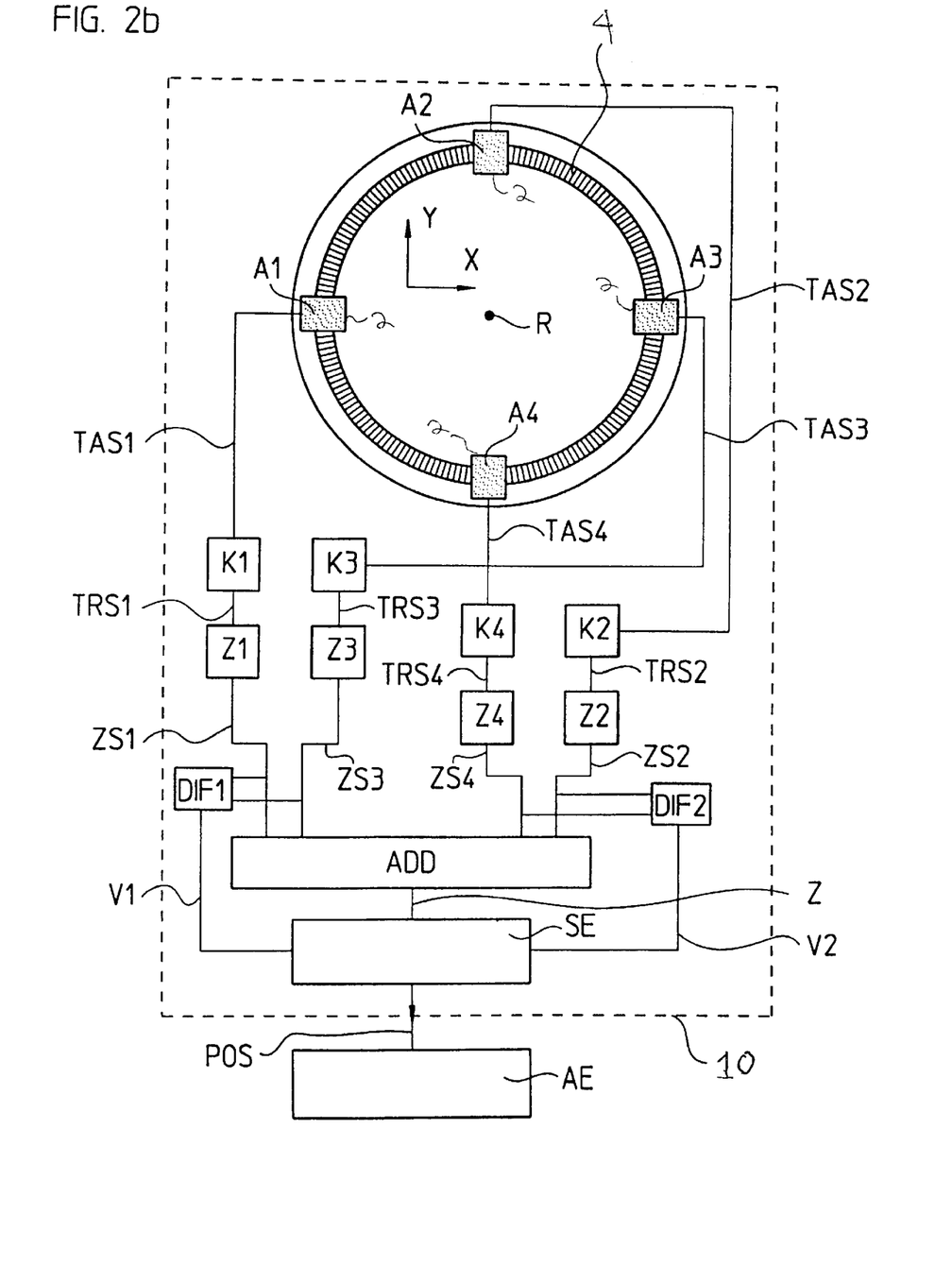
FIG. 2b, is a schematic illustration of a second embodiment of signal processing in the angle measuring system according to the present invention, again of the kind that could be attained in the embodiment of FIG. 1.

The procedure is now different in the two exemplary embodiments of FIGS. 2a and 2b with the error-corrected output signal Z generated in this way, before this signal is finally transmitted to the downstream evaluation unit AE.

In the variant of FIG. 2a, it is provided that the thus-generated signal Z, which finally corresponds to the corrected position measuring value, be delivered to a schematically indicated D/A converter unit D/A, by way of which a conversion of the digital position measuring value Z into error-corrected analog output signals SIN, COS is done. With respect to the realization of the D/A converter unit D/A, it is understood that a number of possibilities exist. For instance, the D/A conversion of the position measuring values Z can be done with the aid of tables stored in memory, and so forth.

The two analog output signals SIN, COS, phase offset by 90°, are then transmitted for further processing to a downstream evaluation unit AE, for example a numerical controller for a machine tool.

The embodiment proposed in FIG. 2a is advantageous especially whenever the angle measuring system 10 of the present invention is to be used in conjunction with evaluation units AE which require sine-wave or cosine-wave analog signals as their input signals.

In the second embodiment, shown in FIG. 2b, of the angle measuring system 10 of the present invention, conversely, the error-corrected output signal Z generated as described above and present at the output of the adder units ADD, is delivered to a signal conditioning unit SE in the angle measuring system 10. The signal conditioning unit SE here has the primary function of conditioning the error-corrected, angle-dependent output signal Z for serial transmission to the downstream evaluation unit AE. Accordingly in this embodiment, what is transmitted to the evaluation unit AE is error-corrected position measuring values POS in serial form.

The advantage of this variant is in particular the reduced expenditure for cable laying between the angle measuring system 10 and the evaluation unit AE, since essentially only one signal transmission line is needed for the data transmission. This embodiment also offers the possibility, along with or in addition to the error-corrected position measuring values POS, of transmitting further data from the angle measuring system 10 to the evaluation unit AE within the scope of the transmission layout selected. The additional data may for instance be concrete information pertaining to a possible bearing eccentricity, or in other words the indication of the offset between the ideal axis of rotation and the actual axis of rotation of the rotary table in the X-Y plane. This is also provided for in the variant in FIG. 2b, to which end the counter states ZS1 and ZS3 of the scanner units 2 opposite one another (designated A1 and A3) are also delivered to a first subtraction unit DIF1, and the counter states ZS2 and ZS4 are delivered to a second subtraction unit. By subtraction between the counter states ZS1 and ZS3, an offset value VI is obtained in a known manner, which indicates any possible offset of the axis of rotation R in the Y direction; analogously, the offset value V2 describes any possible offset of the axis of rotation R in the X direction. The offset values V1, V2 thus formed are also delivered to the signal conditioning unit SE, which likewise conditions these data in such a way that serial transmission together with the position measuring values POS to the evaluation unit is possible. With regard to the determination of the offset values V1, V2, EP 0 325 924 B1, already mentioned above, is also expressly referred to here.

Along with the offset information mentioned, it is understood that still other information, such as monitoring and/or diagnostic data, can be exchanged between the angle measuring system 10 and the evaluation unit AE within the scope of the serial data transmission selected, and so forth.

The present invention is thus in no way limited to the embodiments described here; on the contrary, a number of additional options familiar to one skilled in this art exists within the scope of the concepts of the invention.

I claim:

1. An angle measuring system for high-precision determination of the angular position of an object, the system comprising:
    a stationary component unit comprising one or more D/A converter units, to which error-corrected output signals are delivered, so that analog, angle-dependent output signals are transmitted to a downstream evaluation unit;
    a rotationally symmetrical measurement graduation that is connected to an object that rotates about an axis of rotation (R);
    a correction system comprising:
        a plurality of scanner units disposed in a defined three-dimensional orientation in the stationary component unit and serve to scan the measurement graduation at a plurality of different measurement graduation sites and generate angular-position-dependent fractional scanning signals; and
        a processing system that receives the fractional scanning signals of the scanner units and generates angle-dependent output signals that are freed of errors that result from a possibly occurring nonagreement of the axis of rotation (R) of the object with an axis of symmetry of the measurement graduation, wherein the processing system comprises electronic signal processing elements which process the fractional scanning signals of the plurality of scanner units in such a way that the error-corrected output signals are generated.

2. The angle measuring system of claim 1, wherein the measurement graduation is embodied circular-annularly and is connected in an axial direction to the rotating object.

3. The angle measuring system of claim 2, wherein the measurement graduation is embodied as a transmitting light measurement graduation.

4. The angle measuring system of claim 2, wherein the measurement graduation is connected to a circular-annular carrier ring which is connected to the rotating object.

5. The angle measuring system of claim 4 wherein the measurement graduation is connected to the carrier ring by screw connections that are oriented axially to the axis of rotation (R).

6. The angle measuring system of claim 4, wherein the component unit comprises sealing elements located between the stationary part and the rotating carrier ring.

7. The angle measuring system of claim 5, wherein the component unit comprises sealing elements located between the stationary part and the rotating carrier ring.

8. The angle measuring system of claim 2, wherein the measurement graduation is disposed inside the component unit in a region which is embodied and dimensioned such that no collision results between the measurement graduation and the stationary component unit even in the event that the axis of rotation (R) of the object and the axis of symmetry of the measurement graduation do not exactly agree.

9. The angle measuring system of claim 4, wherein the measurement graduation is disposed inside the component unit in a region which is embodied and dimensioned such that no collision results between the measurement graduation and the stationary component unit even in the event that the axis of rotation (R) of the object and the axis of symmetry of the measurement graduation do not exactly agree.

10. The angle measuring system of claim 9, wherein one or more contact faces are provided between a housing of the stationary component unit and the rotating carrier ring, by way of which one or more contact faces the radial and/or axial motion of the carrier ring can be limited.

11. The angle measuring system of claim 1, wherein each of the plurality of scanner units of the correction system comprises two groups with a plurality of scanning fields per scanner unit, which are geometrically disposed such that the center of area of all the scanning fields of one group is the same as the center of area of the scanning fields of the other group.

12. The angle measuring system of claim 11, wherein each of the two groups includes four scanning fields.

13. The angle measuring system of claim 1, wherein the electronic signal processing elements comprises:
   a plurality of comparator units, to which the analog fractional scanning signals are delivered and by way of which the square-wave fractional scanning signals are generated from the fractional scanning signals;
   a plurality of counter units, to which the square-wave fractional scanning signals are delivered and which on their output side generate defined counter states as a function of the delivered fractional scanning signals; and
   one or more adder units, to which the counter states of the various scanner units are delivered, so that at the output of the one or more adder units, an error-corrected output signal pertaining to the angular position of the rotating object is generated.

14. An angle measuring system for high-precision determination of the angular position of an object, the system comprising:
   a stationary component unit;
   a rotationally symmetrical measurement graduation that is connected to an object that rotates about an axis of rotation (R);
   a correction system comprising:
      a plurality of scanner units disposed in a defined three-dimensional orientation in the stationary component unit and serve to scan the measurement graduation at a plurality of different measurement graduation sites and generate angular-position-dependent fractional scanning signals, and
      a processing system that receives the fractional scanning signals of the scanner units and generates angle-dependent output signals that are freed of errors that result from a possibly occurring nonagreement of the axis of rotation (R) of the object with an axis of symmetry of the measurement graduation, wherein the processing system comprises electronic signal processing elements which process the fractional scanning signals of the plurality of scanner units in such a way that the error-corrected output signals are generated, wherein the electronic signal processing elements comprises:
         a plurality of comparator units, to which the analog fractional scanning signals are delivered and by way of which the square-wave fractional scanning signals are generated from the fractional scanning signals;
         a plurality of counter units, to which the square-wave fractional scanning signals are delivered and which on their output side generate defined counter states as a function of the delivered fractional scanning signals; and
         one or more adder units, to which the counter states of the various scanner units are delivered, so that at the output of the one or more adder units, an error-corrected output signal pertaining to the angular position of the rotating object is generated.

15. The angle measuring system of claim 14, wherein the measurement graduation is embodied circular-annularly and is connected in an axial direction to the rotating object.

16. The angle measuring system of claim 15, wherein the measurement graduation is embodied as a transmitting light measurement graduation.

17. The angle measuring system of claim 15, wherein the measurement graduation is connected to a circular-annular carrier ring which is connected to the rotating object.

18. The angle measuring system of claim 17 wherein the measurement graduation is connected to the carrier ring by screw connections that are oriented axially to the axis of rotation (R).

19. The angle measuring system of claim 17, wherein the component unit comprises sealing elements located between the stationary part and the rotating carrier ring.

20. The angle measuring system of claim 18, wherein the component unit comprises sealing elements located between the stationary part and the rotating carrier ring.

21. The angle measuring system of claim 15, wherein the measurement graduation is disposed inside the component unit in a region which is embodied and dimensioned such that no collision results between the measurement graduation and the stationary component unit even in the event that the axis of rotation (R) of the object and the axis of symmetry of the measurement graduation do not exactly agree.

22. The angle measuring system of claim 17, wherein the measurement graduation is disposed inside the component unit in a region which is embodied and dimensioned such that no collision results between the measurement graduation and the stationary component unit even in the event that the axis of rotation (R) of the object and the axis of symmetry of the measurement graduation do not exactly agree.

23. The angle measuring system of claim 22, wherein one or more contact faces are provided between a housing of the stationary component unit and the rotating carrier ring, by way of which one or more contact faces the radial and/or axial motion of the carrier ring can be limited.

24. The angle measuring system of claim 14, wherein each of the plurality of scanner units of the correction system comprises two groups with a plurality of scanning fields per scanner unit, which are geometrically disposed such that the center of area of all the scanning fields of one group is the same as the center of area of the scanning fields of the other group.

25. The angle measuring system claim 24, wherein each of the two groups includes four scanning fields.

26. An angle measuring system for high-precision determination of the angular position of an object, system comprising:
   a stationary component unit;
   a rotationally symmetrical measurement graduation that is connected to an object that rotates about an axis of rotation (R);
   a correction system comprising:
      a plurality of scanner units disposed in a defined three-dimensional orientation in the stationary component unit and serve to scan the measurement graduation at a plurality of different measurement graduation sites and generate angular- position-dependent fractional scanning signals; and a processing system that receives the fractional scanning signals of the scanner units and generates angle-dependent output signals that are freed of errors that result from a possibly occuring nonagreement of the axis of rotation (R) of the object with an axis of symmetry of the measurement graduation, wherein the processing system comprises electronic signal processing elements which process the fractional scanning signals of the plurality of scanner units in such a way that the error-corrected output signals are generated; and wherein in the stationary component unit a signal conditioning unit is also disposed, to which the error-corrected output signals are delivered, and which conditions the error-corrected output signals for serial transmission to a downstream evaluation unit.

27. The angle measuring system of claim 26, wherein the angle measuring system includes further components, by way of which, from the fractional scanning signals generated, additional offset information regarding any possible offset of the rotating object are generated, and these items of offset information are also delivered to the signal conditioning unit, which conditions the items of offset information for serial transmission to a downstream evaluation unit.

28. The angle measuring system of claim 27, further comprising:

at least two subtraction units, to which the counter states of square-wave fractional scanning signals, each from opposed ones of the plurality of scanner units, are delivered.

29. The angle measuring system of claim 26, wherein the measurement graduation is embodied circular-annularly and is connected in an axial direction to the rotation object.

30. The angle measuring system of claim 29, wherein the measurement graduation is embodied as a transmitting light measurement graduation.

31. The angle measuring system of claim 29, wherein the measurement graduation is connected to a circular-annular carrier ring which is connected to the rotation object.

32. The angle measuring system of claim 31, wherein the measurement is connected to the carrier ring by screw connections that are oriented axially of rotation (R).

33. The angle measuring system of claim 31, wherein the component unit comprises sealing elements located between the stationary part and the rotating carrier ring.

34. The angle measuring system of claim 32, wherein the component unit comprises sealing elements located between the stationary part and the rotating carrier ring.

35. The angle measuring system of claim 29, wherein the measurement graduation is disposed inside the component unit in a region which is embodied and dimensioned such that no collision results between the measurement graduation and the stationary component unit even in the event that the axis of rotation (R) of the object and the axis of symmetry of the measurement graduation do not exactly agree.

36. The angle measuring system of claim 31, wherein the measurement graduation is disposed inside the component unit in a region which is embodied and dimensioned such that no collision results between the measurement graduation and the stationary component unit even in the event that the axis of rotation (R) of the object and the axis of symmetry of the measurement graduation do not exactly agree.

37. The angle measuring system of claim 36, wherein one or more contact faces are provided between a housing of the stationary component unit and the rotating carrier ring, by way of which one or more contact faces the radial and/or axial motion of the carrier ring can be limited.

38. The angle measuring system of claim 26, wherein each of the plurality of scanner units of the correction system comprises two groups with a plurality of scanning fields per scanner unit, which are geometrically disposed such that the center of area of all the scanning fields of one group is the same as the center of area of the scanning fields of the other group.

39. The angle measuring system of claim 38, wherein each of the two groups includes four scanning fields.

40. An angle measuring system for high-precision determination of the angular position of an object, the system comprising:

a stationary component unit;

a rotationally symmetrical measurement graduation that is connected to an object that rotates about an axis of rotation (R); and a correction system comprising:

a plurality of scanner units disposed in a defined three-dimensional orientation in the stationary component unit and serve to scan the measurement graduation at a plurality of different measurement graduation sites and generate angular-position-dependent fractional scanning signals and a processing system that receives the fractional scanning signals of the scanner units and generates angle-dependent output signals that are freed of errors that result from a possibly occurring nonagreement of the axis of rotation (R) of the object with an axis of symmetry of the measurement graduation.

* * * * *

UNITED STATES PATENT AND TRADEMARK OFFICE
CERTIFICATE OF CORRECTION

PATENT NO.      : 6,410,910 B1
DATED           : June 25, 2002
INVENTOR(S)     : Kurt Feichtinger It is certified that error appears in the above-identified patent and that said Letters Patent is hereby corrected as shown below:

<u>Column 10,</u>
Line 59, before "system" insert -- the --.

<u>Column 11,</u>
Line 39, delete "rotation" and substitute -- rotating -- in its place.
Line 45, delete "rotation" and substitute -- rotating -- in its place.
Line 47, after "measurement" insert -- graduation --.
Line 48, after "axially" insert -- to the axis --.

<u>Column 12,</u>
Line 44, immediately after "signals" insert -- ; -- (semicolon).

Signed and Sealed this

Third Day of February, 2004

JON W. DUDAS
*Acting Director of the United States Patent and Trademark Office*